United States Patent
Yeh

(10) Patent No.: US 8,209,472 B2
(45) Date of Patent: Jun. 26, 2012

(54) DATA WRITING METHOD FOR FLASH MEMORY AND CONTROL CIRCUIT AND STORAGE SYSTEM USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 264 days.

(21) Appl. No.: 12/561,879

(22) Filed: Sep. 17, 2009

(65) Prior Publication Data

US 2011/0029719 A1    Feb. 3, 2011

(30) Foreign Application Priority Data

Aug. 3, 2009  (TW) .............................. 98126116 A

(51) Int. Cl.
*G06F 12/00* (2006.01)
*G06F 12/02* (2006.01)
(52) U.S. Cl. .......... 711/103; 711/E12.001; 711/E12.008
(58) Field of Classification Search .................. 711/103, 711/E12.001, E12.008
See application file for complete search history.

(56) References Cited

U.S. PATENT DOCUMENTS 7,739,443 B2 * 6/2010 Aizawa .................... 711/103

FOREIGN PATENT DOCUMENTS

| CN | 1447242 A | 10/2003 |
| CN | 1510689 A | 7/2004 |

OTHER PUBLICATIONS

Chinese Examination Report of China Application No. 200910165894.9, dated Jan. 31, 2012.

* cited by examiner

*Primary Examiner* — Jasmine Song
(74) *Attorney, Agent, or Firm* — J.C. Patents

(57) ABSTRACT

A data writing method for moving data in a plurality of flash memory modules during a write command of a host system is executed is provided, wherein each of the flash memory modules has a plurality of physical blocks. The present data writing method includes transferring first data received from the host system to one of the flash memory modules and writing the first data into the physical blocks of the flash memory module according to the write command. The present data writing method also includes moving at least one second data in the physical blocks of another one of the flash memory modules during the first data is written. Thereby, when the host system is about to write data into the other flash memory module, the time for executing the write command is effectively reduced.

21 Claims, 5 Drawing Sheets

DATA WRITING METHOD FOR FLASH MEMORY AND CONTROL CIRCUIT AND STORAGE SYSTEM USING THE SAME

CROSS-REFERENCE TO RELATED APPLICATION

This application claims the priority benefit of Taiwan application serial no. 98126116, filed Aug. 3, 2009. The entirety of the above-mentioned patent application is hereby incorporated by reference herein and made a part of specification.

BACKGROUND

1. Technology Field

The present invention relates to a data writing method for a flash memory and a flash memory control circuit and a flash memory storage system using the same.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A solid state drive (SSD) is a storage device which uses a NAND flash memory as its storage medium.

Generally speaking, a flash memory chip in a flash memory storage device has a plurality of physical blocks, and a flash memory controller of the flash memory storage device logically groups these physical blocks into a system area, a data area, a spare area, and a replacement area. The physical blocks in the system area are configured to store information related to the flash memory storage device, and the physical blocks in the replacement area are configured to replace damaged physical blocks in the data area and the spare area. Thus, a host system cannot access the physical blocks in the system area and the replacement area in general access states. The physical blocks in the data area are configured to store valid data written by write commands, and the physical blocks in the spare area are configured to substitute the physical blocks in the data area when the write commands are executed. To be specific, when the flash memory storage device receives a write command from the host system and accordingly is about to update (or write) data in a physical block in the data area, the flash memory storage device selects a physical block form the spare area, moves the valid old data originally stored in the physical block of the data area to be updated to the physical block selected from the spare area, and then writes the new data into the physical block selected from the spare area. After that, the flash memory storage device logically links the physical block containing the new data to the data area, erases the physical block in the data area to be update and links it to the spare area. The flash memory storage device provides logical blocks to the host system in order to allow the host system to successfully access the physical blocks that are alternatively configured to store data. Namely, the flash memory storage device reflects the alternation of the physical blocks by recording and updating the mapping relationship between the logical blocks and the physical blocks of the data area in a logical block-physical block mapping table, so that the host system simply accesses data in the provided logical block while the flash memory storage device actually accesses data in the corresponding physical block according to the logical block-physical block mapping table.

However, the capacity of each physical block has been increased along with the advancement of flash memory fabricating process. As a result, the time required for moving foregoing old valid data is increased, and accordingly the time required by the flash memory storage device for executing a write command from the host system may exceed the specified time of a flash memory storage product (for example, a SD memory card). Thereby, how to shorten the time required by a flash memory storage device for executing a write command is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method which can effectively shorten the time for executing a write command.

The present invention is directed to a flash memory control circuit which can execute foregoing data writing method to effectively shorten the time for executing a write command.

The present invention is directed to a flash memory storage system which can execute foregoing data writing method to effectively shorten the time for executing a write command.

According to an exemplary embodiment of the present invention, a data writing method for moving data in a first flash memory module or a second flash memory module during a write command of a host system is executed is provided, wherein the first flash memory module and the second flash memory module respectively have a plurality of physical blocks. The present data writing method includes providing a flash memory controller, transferring first data received from the host system to the first flash memory module and writing the first data into the physical blocks of the first flash memory module according to the write command by using the flash memory controller, wherein the flash memory controller is coupled to the first flash memory module and the second flash memory module through the same data input/output bus. The present data writing method further includes moving at least one second data of at least one physical block in the physical blocks of the second flash memory module by using the flash memory controller during the first data is written into the physical blocks of the first flash memory module.

According to an exemplary embodiment of the present invention, a flash memory control circuit for moving data in a first flash memory module or a second flash memory module during a write command of a host system is executed is provided, wherein the first flash memory module and the second flash memory module respectively have a plurality of physical blocks. The flash memory control circuit includes a microprocessor unit, a flash memory interface unit, a host interface unit, and a memory management unit. The flash memory interface unit is coupled to the microprocessor unit, and configured to couple to the first flash memory module and the second flash memory module through the same data input/output bus. The host interface unit is coupled to the microprocessor unit and configured to couple to a host system. The memory management unit is coupled to the microprocessor unit, and the memory management unit transfers first data received from the host system to the first flash memory module and writes the first data into the physical blocks of the first flash memory module according to the write command. Besides, during the first data is written into the physical blocks of the first flash memory module, the memory management unit moves at least one second data of at least one physical block in the physical blocks of the second flash memory module.

According to an exemplary embodiment of the present invention, a flash memory storage system including a connector, a flash memory chip, and a flash memory controller is provided. The connector is configured to couple to a host system. The flash memory chip has a first flash memory module and a second flash memory module, wherein the first flash memory module and the second flash memory module respectively have a plurality of physical blocks. The flash memory controller is coupled to the connector and to the first flash memory module and the second flash memory module through the same data input/output bus. The flash memory controller receives a write command and first data from the host system, and the flash memory controller transfers the first data to the first flash memory module and writes the first data into the physical blocks of the first flash memory module according to the write command. Besides, during the first data is written into the physical blocks of the first flash memory module, the flash memory controller moves at least one second data of at least one physical block in the physical blocks of the second flash memory module.

According to an exemplary embodiment of the present invention, a data writing method for moving data in one of a plurality of flash memory modules when a write command of a host system is executed is provided, wherein each of the flash memory modules has a plurality of physical blocks. The present data writing method includes providing a flash memory controller and transferring first data received from the host system to one of the flash memory modules and writing the first data into the physical blocks of the flash memory module according to the write command by using the flash memory controller. The present data writing method further includes moving at least one second data of at least one physical block in the physical blocks of another one of the flash memory modules by using the flash memory controller during the first data is written into the physical blocks of one of the flash memory modules.

As described above, the data writing method provided by the present invention can effectively shorten the time for executing write commands.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
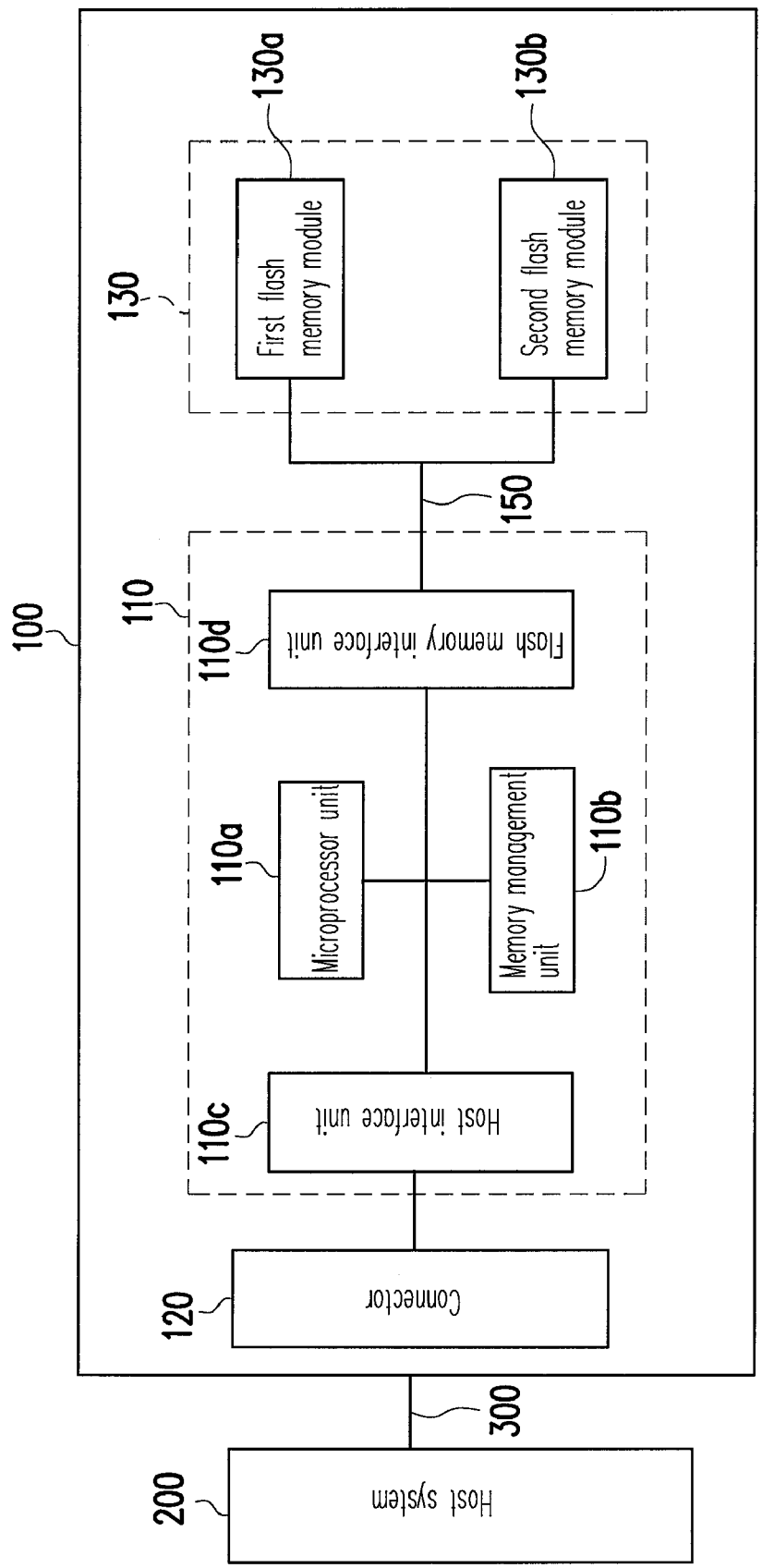
FIG. 1 is a schematic block diagram of a flash memory storage system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram of a flash memory storage system according to an exemplary embodiment of the present invention.

Referring to FIG. 1, the flash memory storage device 100 usually works together with a host system 200 so that the host system 200 can store data into or read data from the flash memory storage device 100. In the present exemplary embodiment, the flash memory storage device 100 is a SD memory card. However, in another exemplary embodiment of the present invention, the flash memory storage device 100 may also be a solid state drive (SSD) or a flash drive.

The flash memory storage device 100 includes a flash memory controller (also referred to as a flash memory control circuit) 110, a connector 120, and a flash memory chip 130.

The flash memory controller 110 executes a plurality of logic gates or control commands implemented in a hardware or a firmware form and performs different data operations in the flash memory chip 130 according to commands of the host system 200. The flash memory controller 110 includes a microprocessor unit 110a, a memory management unit 110b, a host interface unit 110c, and a flash memory interface unit 110d.

The microprocessor unit 110a is the main control unit of the flash memory controller 110, and which cooperates with the memory management unit 110b, the host interface unit 110c, and the flash memory interface unit 110d to carry out various operations of the flash memory storage device 100.

The memory management unit 110b is coupled to the microprocessor unit 110a and executes a block management mechanism and a data writing mechanism according to the present exemplary embodiment. Below, the operation of the memory management unit 110b will be described in detail with reference to accompanying drawings.

In the present exemplary embodiment, the memory management unit 110b is implemented in the flash memory controller 110 as a firmware form. For example, the memory management unit 110b including a plurality of control commands is burned into a program memory (for example, a read only memory (ROM)), and the program memory is embedded into the flash memory controller 110. When the flash memory storage device 100 is in operation, the control commands of the memory management unit 110b are executed by the microprocessor unit 110a to accomplish the block management mechanism and the data writing mechanism according to the present embodiment.

In another exemplary embodiment of the present invention, the control commands of the memory management unit 110b may also be stored in a specific area (for example, the system area in a flash memory exclusively used for storing system data) of the flash memory chip 130 as program codes. Similarly, when the flash memory storage device 100 is in operation, the program commands of the memory management unit 110b are executed by the microprocessor unit 110a. In addition, in yet another exemplary embodiment of the present invention, the memory management unit 110b may also be implemented in the flash memory controller 110 in a hardware form.

The host interface unit 110c is coupled to the microprocessor unit 110a and configured to receive and identify commands and data received from the host system 200. Namely, the commands and data received from the host system 200 are transferred to the microprocessor unit 110a through the host interface unit 110c. In the present exemplary embodiment, the host interface unit 110c is a secure digital (SD) interface. However, the present invention is not limited thereto, and the host interface unit 110c may also be a universal serial bus (USB) interface, an Institute of Electrical and Electronic Engineers (IEEE) 1394 interface, a peripheral component interconnect (PCI) express interface, a serial advanced technology attachment (SATA) interface, a memory sick (MS) interface, a multi media card (MMC) interface, a compact flash (CF) interface, an integrated device electronics (IDE) interface, or other suitable data transmission interfaces.

The flash memory interface unit 110d is coupled to the microprocessor unit 110a and configured to access the flash memory chip 130. Namely, data to be written into the flash memory chip 130 is converted by the flash memory interface unit 110d into a format acceptable to the flash memory chip 130. In the present exemplary embodiment, the flash memory interface unit 110d is coupled to the flash memory chip 130 through a single data input/output bus 150. However, the present invention is not limited thereto, and in another exemplary embodiment of the present invention, the flash memory interface unit 110d may also be coupled to the flash memory chip 130 through multiple data input/output buses.

In addition, even though not shown in the present exemplary embodiment, the flash memory controller 110 may further include some other general function modules for controlling the flash memory, such as a buffer memory, an error correcting unit, and a power management unit.

The connector 120 is coupled to the flash memory controller 110 and configured to couple to the host system 200 through the bus 300. In the present exemplary embodiment, the connector 120 is a SD connector. However, the present invention is not limited thereto, and the connector 120 may also be a USB connector, an IEEE 1394 connector, a PCI express connector, a SATA connector, a MS connector, a MMC connector, a CF connector, an IDE connector, or other suitable connectors.

The flash memory chip 130 is coupled to the flash memory controller 110 and configured to store data. The flash memory chip 130 has a first flash memory module 130a and a second flash memory module 130b. The first flash memory module 130a and the second flash memory module 130b are composed of a plurality of physical blocks 310-(0)~310-(N), wherein each of the physical blocks is served as the smallest unit for erasing data (i.e., each physical block contains the least number of memory cells that are erased together). Each physical block is usually divided into a plurality of pages. In the present exemplary embodiment, each page is served as the smallest unit for programming data (i.e., each page is served as the smallest unit for writing or reading data). Each page is usually divided into a user data area and a redundant area, wherein the user data area is configured to store user data, and the redundant area is configured to store system data (for example, an error checking and correcting (ECC) code). In the present exemplary embodiment, both the first flash memory module 130a and the second flash memory module 130b are multi level cell (MLC) NAND flash memories. It should be understood that the number of flash memory modules is not limited to 2 in the present invention, and in another exemplary embodiment of the present invention, the flash memory chip 130 may have any number of flash memory modules.

It should be noted that in the present exemplary embodiment, the first flash memory module 130a and the second flash memory module 130b are MLC NAND flash memories, and the physical blocks in a MLC NAND flash memory are programmed in multiple phases. Taking a 2 level cell NAND flash memory as an example, the physical blocks thereof are programmed in two phases. During the first phase, data is written into lower pages, and the physical characteristic thereof is similar to that of a single level cell (SLC) NAND flash memory. Data is written into the upper pages after the first phase is completed. Because the writing speed of the lower pages is faster than that of the upper pages, the pages in each physical block can be categorized as low-speed pages (i.e., the upper pages) and high-speed pages (i.e., the lower pages). Similarly, in an 8 level cell or a 16 level cell, each memory cell contains more pages and accordingly is programmed in more phases. Herein the pages having the highest writing speed are referred to as lower pages, and other pages having lower writing speeds are referred to as upper pages. For example, the upper pages include a plurality of pages having different writing speeds. Besides, in other embodiments, the upper pages may also be pages having the lowest writing speed or pages having the lowest writing speed and some pages having their writing speeds faster than the lowest writing speed. For example, in a 4 level cell, the lower pages are the pages having the highest and the second highest writing speeds, while the upper pages are pages having the lowest and the second lowest writing speeds.

In the present exemplary embodiment, the memory management unit 110b only writes data into the lower pages of the physical blocks of the first flash memory module 130a.

Even though both the first flash memory module 130a and the second flash memory module 130b are MLC NAND flash memories in the present exemplary embodiment, the present invention is not limited thereto, and in another exemplary embodiment of the present invention, the first flash memory module 130a and the second flash memory module 130b may both be SLC NAND flash memories, or one of the first flash memory module 130a and the second flash memory module 130b is a MLC NAND flash memory while the other one is a SLC NAND flash memory.

FIG. 2 and FIGS. 3A~3C illustrate the operations performed on physical blocks of a flash memory module according to the present exemplary embodiment of the present invention. The first flash memory module 130a and the second flash memory module 130b have the same operation therefore only the operation of the first flash memory module 130a will be described herein.

It should be understood that the terms, such as "select", "move", "replace", "substitute", "alternate", and "group", for describing the operations of the physical blocks in a flash memory only refer to logical operations performed to these physical blocks. Namely, the actual positions of these physical blocks in the flash memory are not changed. Instead, these physical blocks in the flash memory are only logically operated. It should be mentioned that the operations described below are executed by the memory management unit 110b of the flash memory controller 110.

Figure 2:
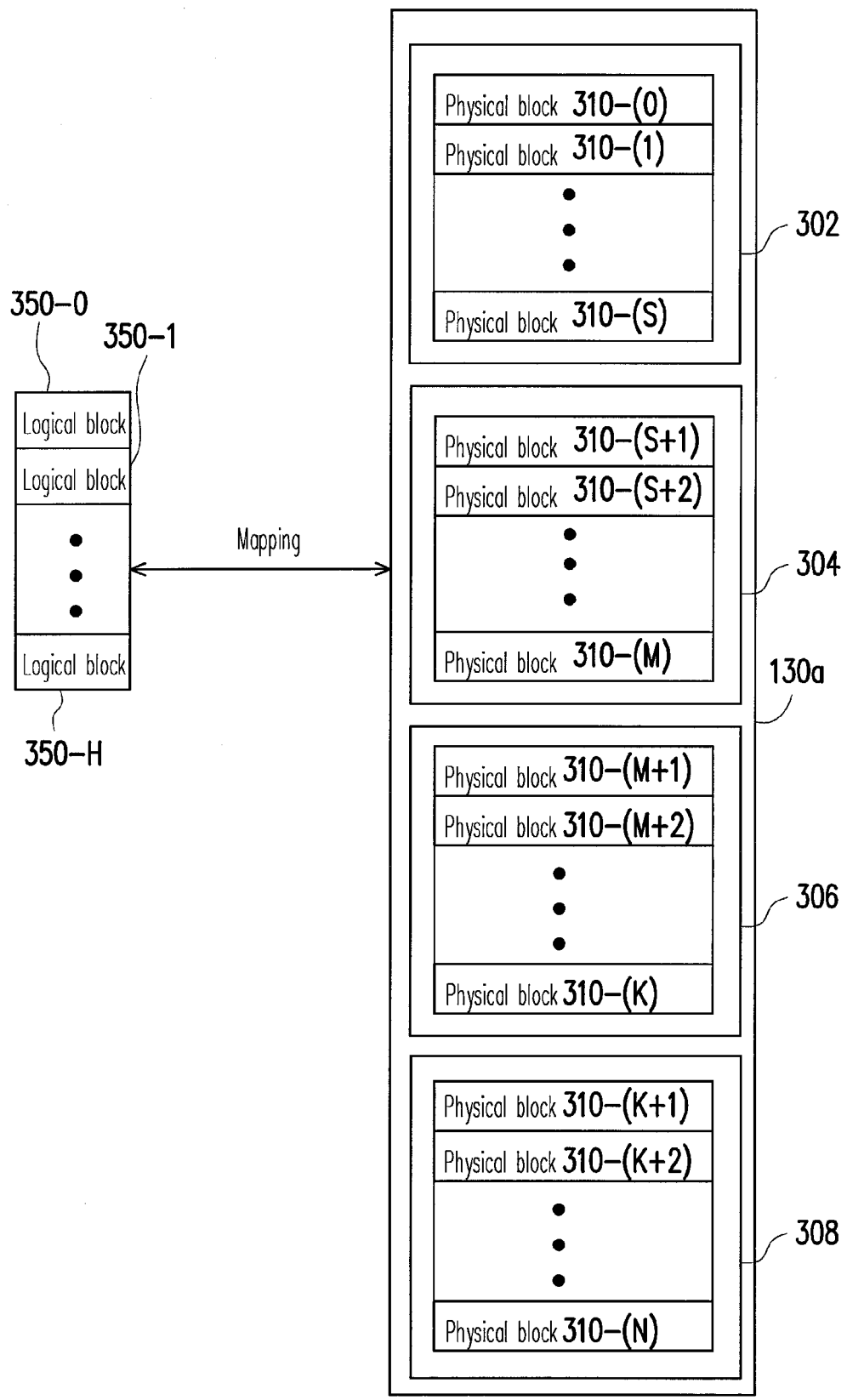
FIG. 2 and FIGS. 3A~3C illustrate the operations performed on physical blocks of a flash memory module according to a first exemplary embodiment of the present invention.

Referring to FIG. 2, the memory management unit 110b logically groups the physical blocks 310-(0)~310-(N) of the first flash memory module 130a and the second flash memory module 130b respectively into a system area 302, a data area 304, a spare area 306, and a replacement area 308.

The physical blocks 310-(0)~310-(S) logically belonging to the system area 302 are configured to record system data, wherein the system data includes the manufacturer and model of the flash memory chip, the number of zones in each flash memory module, the number of physical blocks in each zone, and the number of pages in each physical block.

The physical blocks 310-(S+1)~310-(M) logically belonging to the data area 304 are configured to store user data, and these physical blocks are usually the physical blocks mapped to the logical blocks accessed by the host system 200. Namely, the physical blocks in the data area are configured to store valid data.

The physical blocks 310-(M+1)~310-(K) logically belonging to the spare area 306 are configured to substitute the physical blocks in the data area 304. Accordingly, the physical blocks in the spare area are either blank or available blocks (i.e., no data is recorded in these blocks or data recorded in these blocks is marked as invalid data). In other words, the physical blocks in the data area and the spare area are alternatively configured to store data written into the flash memory storage device 100 by the host system 200.

The physical blocks 310-(K+1)~310-(N) logically belonging to the replacement area 308 are replacement physical blocks. For example, when the flash memory chip 130 is manufactured, 4% of its physical blocks are reserved for substitution purpose. Namely, when any physical block in the system area 302, the data area 304, and the spare area 306 is damaged, a physical block in the replacement area 308 is configured to replace the damaged physical block (i.e., the bad block). Thus, if there are still available physical blocks in the replacement area 308 and a physical block is damaged, the memory management unit 110b selects an available physical block from the replacement area 308 for replacing the damaged physical block. If there is no more available physical block in the replacement area 308 and a physical block is damaged, the flash memory storage device 100 is announced as being write-protected and data cannot be written therein.

Because data from the host system 200 is written into the flash memory storage device 100 in the alternative pattern described above, the flash memory controller 110 provides logical blocks 350-0~350-H to the host system 200 for accessing data and maintains a logical address-physical address mapping table for recording the mapping relationship between the logical blocks 350-0~350-H and the physical blocks 310-(0)~310-(N).

Figure 3A:
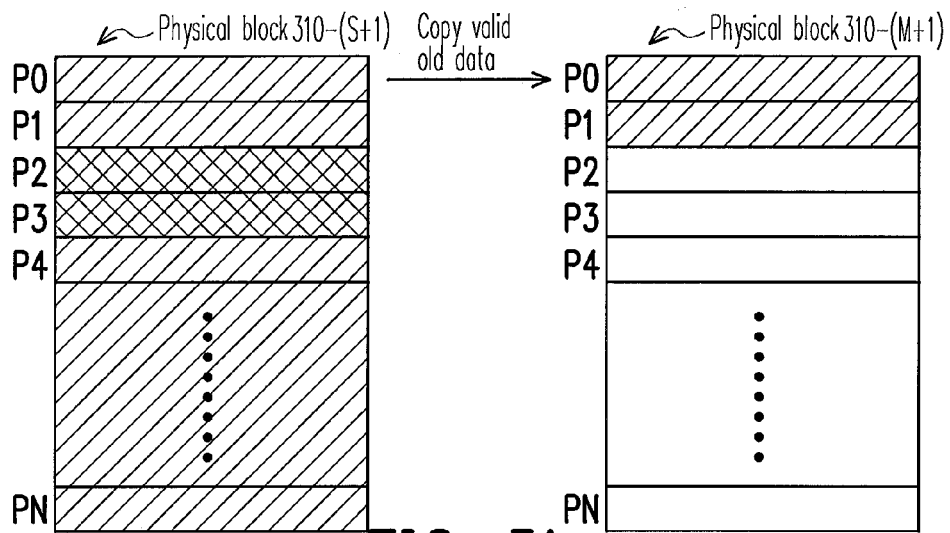
Figure 3B:
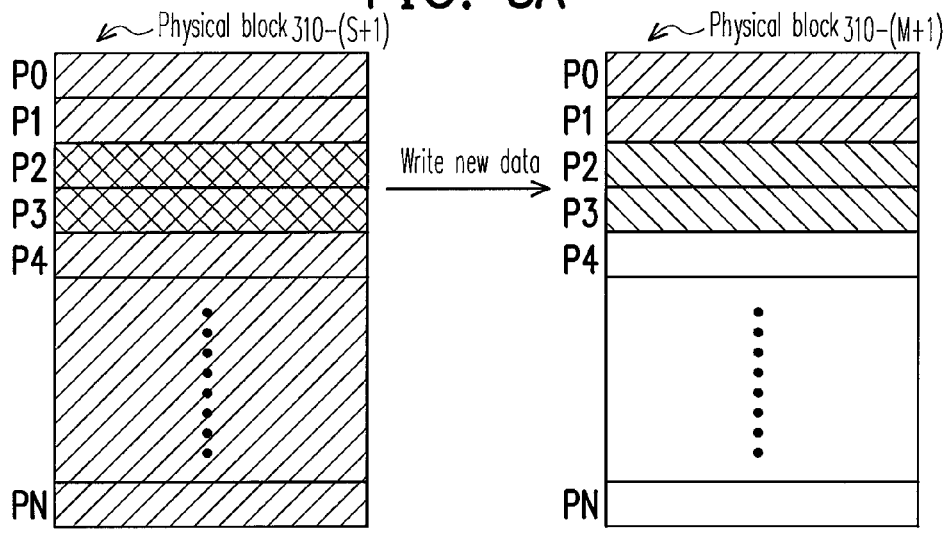
Figure 3C:
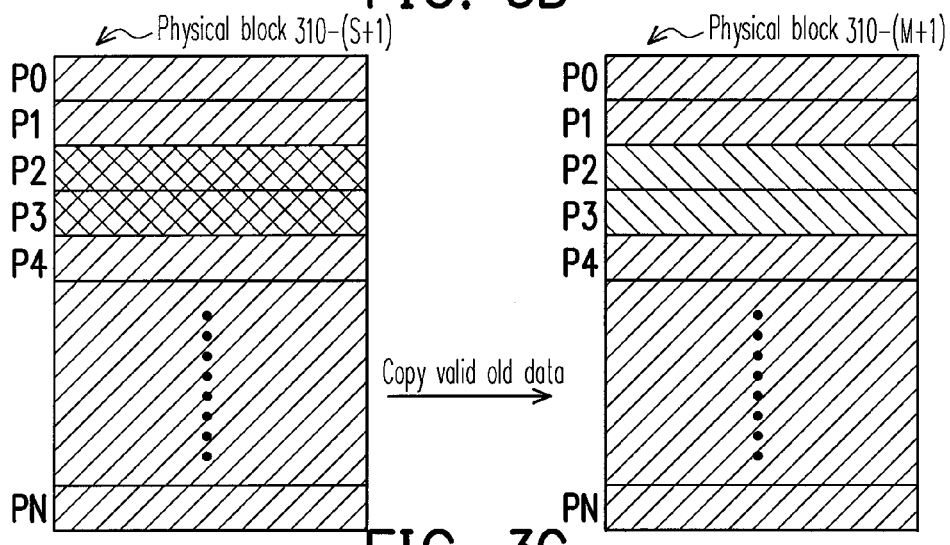

Referring to FIGS. 3A~3C, for example, when the host system 200 is about to write data into the logical block 350-0, the flash memory controller 110 gets to know that the logical block 350-0 is currently mapped to the physical block 310-(S+1) in the data area 304 according to the logical address-physical address mapping table. Thus, the memory management unit 110b updates the data in the physical block 310-(S+1). Meanwhile, the flash memory controller 110 selects the physical block 310-(M+1) from the spare area 306 for substituting the physical block 310-(S+1) in the data area 304. However, when the memory management unit 110b writes the new data into the physical block 310-(M+1), it does not instantly move all the valid old data in the physical block 310-(S+1) to the physical block 310-(M+1) to erase the physical block 310-(S+1). To be specific, the memory management unit 110b copies the valid old data before the page for writing the new data (i.e., the pages P0 and P1) in the physical block 310-(S+1) to the physical block 310-(M+1) (as shown in FIG. 3A), and then writes the new data (i.e., the pages P2 and P3 in the physical block 310-(M+1)) into the physical block 310-(M+1) (as shown in FIG. 3B). By now, the flash memory controller 110 completes the data writing operation and responds to the host system 200 that the write command has been executed. Because the valid data in the physical block 310-(S+1) may become invalid during a next operation (for example, a write command), instantly moving all the valid data in the physical block 310-(S+1) to the physical block 310-(M+1) may become meaningless. In the present example, the combined content of the physical block 310-(S+1) and the physical block 310-(M+1) is the content of the corresponding logical block 350-0. Herein the physical block 310-(S+1) and the physical block 310-(M+1) are referred to as mother-child blocks. The number of mother-child blocks is determined according to the size of a buffer memory (not shown) in the flash memory controller 110, and the action of temporarily maintaining such a mother-child relationship is referred to as opening mother-child blocks.

The flash memory controller 110 only integrates the physical block 310-(S+1) and the physical block 310-(M+1) into a single physical block when subsequently the contents of the physical block 310-(S+1) and the physical block 310-(M+1) are to be actually combined, so that the efficiency in using these blocks can be increased. This combination action is referred to as closing the mother-child blocks.

For example, as shown in FIG. 3C, when the host system 200 transfers a write command to the flash memory controller 110 to store data into another logical block and the memory management unit 110b determines that the number of open mother-child blocks has reached the upper limit of the system and accordingly needs to integrate the physical block 310-(S+1) and the physical block 310-(M+1), the memory management unit 110b copies the remaining valid data (i.e., the pages P4~PN) in the physical block 310-(S+1) to the physical block 310-(M+1), then erases the physical block 310-(S+1) and associates it with the spare area 306. Meanwhile, the memory management unit 110b associates the physical block 310-(M+1) with the data area 304 and maps the logical block 350-0 to the physical block 310-(M+1) in the logical address-physical address mapping table, so as to close the mother-child blocks.

As described above, when the memory management unit 110b has to close the mother-child blocks in order to execute another write command to store data into another logical block, the time for executing this write command will be delayed because data has to be moved to close the mother-child blocks. In particular, the greater the page capacity of the physical blocks is, the longer time has to be spent for moving the data. As a result, the write command may not be completed within the specified time and the timeout problem may be caused. In the present exemplary embodiment, when the memory management unit 110b executes a write command on any one of the flash memory modules, it alternatively moves data in another flash memory module to close the mother-child blocks therein. Namely, the memory management unit 110b sorts the data in another flash memory module when it executes a write command in a specific flash memory module.

To be specific, when data is written into the flash memory modules, the process is divided into a data transferring portion and a data programming portion. In other words, during data is stored in the pages of a flash memory module, a control circuit of the flash memory storage device transfers the data into a buffer (not shown) of the flash memory module. After that, the flash memory module programs the data in the buffer into the pages, wherein the flash memory module is in a busy status when it programs the data into the pages, and the control circuit cannot issue any command or transfer any data to the flash memory module when the flash memory module is in the busy status.

Figure 4:
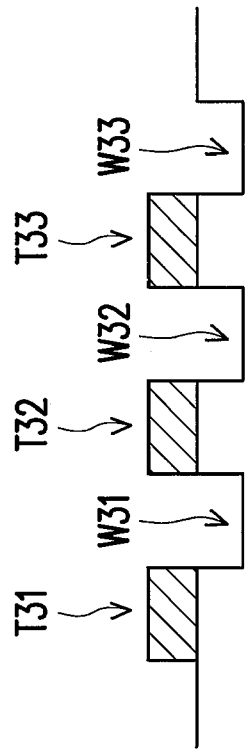
FIG. 4 is a timing diagram illustrating an example of executing a writing command in a flash memory module according to an exemplary embodiment of the present invention.

FIG. 4 is a timing diagram illustrating an example of executing a writing command in a flash memory module according to an exemplary embodiment of the present invention, it is illustrated that the operation of the first flash memory module 130a when the memory management unit 110b executes a write command from the host system. In the example illustrated in FIG. 4, the write command of the host system 200 instructs the memory management unit 110b to write 3 data into 3 pages of a specific physical block of the first flash memory module 130a.

Referring to FIG. 4, the memory management unit 110b transfers first data to the first flash memory module 130a through the data input/output bus 150 (i.e., the transferring action T31). Then, the first data is written into the first flash memory module 130a (i.e., the programming action W31). Herein the first flash memory module 130a is in a busy status. After the first data is written, the memory management unit 110b transfers second data to the first flash memory module 130a through the data input/output bus 150 (i.e., the transferring action T32), and the second data is then written into the first flash memory module 130a (i.e., the programming action W32). Finally, the memory management unit 110b transfers third data to the first flash memory module 130a through the data input/output bus 150 (i.e., the transferring action T33), and the third data is then written into the first flash memory module 130a (i.e., the programming action W33). The present invention is not limited to the example illustrated in FIG. 4, and more than 3 data may be written into a physical block of the first flash memory module 130a.

In the present exemplary embodiment, the memory management unit 110b sorts the data in another flash memory module when one of the flash memory modules is in the busy status.

Figure 5A:
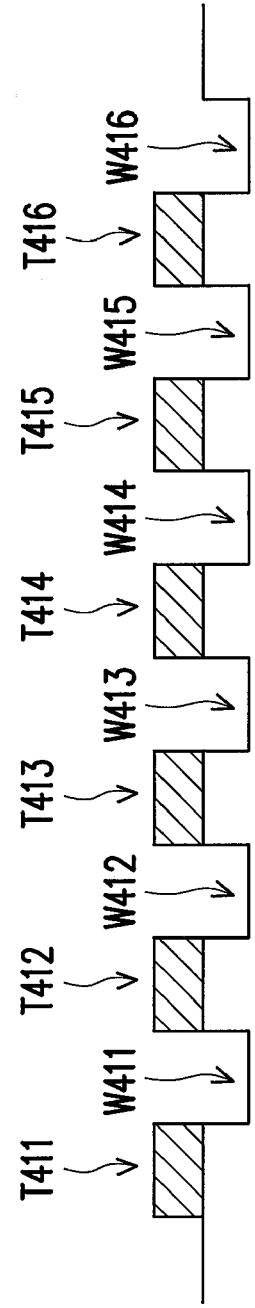
FIGS. 5A~5B are timing diagrams illustrating an example of simultaneously executing a write command and sorting data according to an exemplary embodiment of the present invention.
Figure 5B:
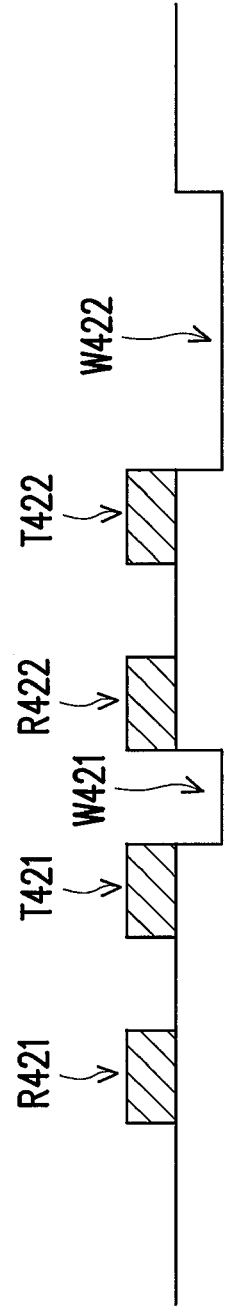

FIGS. 5A-5B are timing diagrams illustrating an example of simultaneously executing a write command and sorting data according to an exemplary embodiment of the present invention, wherein FIG. 5A illustrates the operation of the first flash memory module 130a, and FIG. 5B illustrates the operation of the second flash memory module 130b. In the present example, a write command of the host system 200 instructs the memory management unit 110b to write 6 data into 6 pages of the physical block 310-(S+1) of the first flash memory module 130a, and the memory management unit 110b moves 2 data to be combined (as shown in FIG. 3C) in the second flash memory module 130b when the write command is executed, wherein the 2 combined data is moved from the physical block 310-(M) to another physical block 310-K.

Referring to both FIG. 5A and FIG. 5B, the memory management unit 110b transfers first data to the first flash memory module 130a through the data input/output bus 150 (i.e., the transferring action T411). Then, the first data is written into the physical block 310-(S+1) of the first flash memory module 130a (i.e., the programming action W411). Herein the first flash memory module 130a is in a busy status, and the memory management unit 110b reads first combined data from the physical block 310-(M) of the second flash memory module 130b through the data input/output bus 150 during this period (i.e., the reading action R421).

Next, after the first flash memory module 130a completes the programming action W411, the memory management unit 110b transfers second data to the first flash memory module 130a through the data input/output bus 150 (i.e., the transferring action T412), and the second data is then written into the physical block 310-(S+1) of the first flash memory module 130a (i.e., the programming action W412). Herein the first flash memory module 130a enters the busy status again, and the memory management unit 110b transfers the first combined data to the second flash memory module 130b through the data input/output bus 150 during this period (i.e., the transferring action T421), and the first combined data is then written into the physical block 310-(K) of the second flash memory module 130b (i.e., the programming action W421).

Similarly, after the first flash memory module 130a completes the programming action W412, the memory management unit 110b transfers third data to the first flash memory module 130a through the data input/output bus 150 (i.e., the transferring action T413), and the third data is then written into the physical block 310-(S+1) of the first flash memory module 130a (i.e., the programming action W413). Herein the first flash memory module 130a is in the busy status, and the memory management unit 110b reads second combined data from the physical block 310-(M) of the second flash memory module 130b through the data input/output bus 150 during this period (i.e., the reading action R422).

After the first flash memory module 130a completes the programming action W413, the memory management unit 110b transfers fourth data to the first flash memory module 130a through the data input/output bus 150 (i.e., the transferring action T414), and the fourth data is then written into the physical block 310-(S+1) of the first flash memory module 130a (i.e., the programming action W414). Herein the first flash memory module 130a enters the busy status again, and the memory management unit 110b transfers the second combined data to the second flash memory module 130b through the data input/output bus 150 during this period (i.e., the transferring action T422), and the second combined data is written into the physical block 310-(K) of the second flash memory module 130b (i.e., the programming action W422).

Subsequently, the memory management unit 110b transfers fifth data to the first flash memory module 130a through the data input/output bus 150 (i.e., the transferring action T415), and the fifth data is then written into the physical block 310-(S+1) of the first flash memory module 130a (i.e., the programming action W415). Finally, the memory management unit 110b transfers sixth data to the first flash memory module 130a through the data input/output bus 150 (i.e., the transferring action T416), and the sixth data is then written into the physical block 310-(S+1) of the first flash memory module 130a (i.e., the programming action W416). Meanwhile, the second flash memory module 130b completes the programming action W422. It should be mentioned that the programming action W422 takes longer time than the programming action W421, and this is because the memory management unit 110b writes data into the upper pages and the lower pages of the second flash memory module 130b, while the programming action W422 is to write data into only the upper pages.

Even though it is described in the present exemplary embodiment that the data to be combined in the second flash memory module 130b is moved when a write command is executed on the first flash memory module 130a, the present invention is not limited thereto, and the memory management unit 110b may also move the data to be combined in the first flash memory module 130a when a write command is executed on the second flash memory module 130b.

It should be mentioned that in the example illustrated in FIG. 5A and FIG. 5B, the memory management unit 110b first reads data into the buffer memory through the data input/output bus 150 and then writes the data into the second flash memory module 130b through the data input/output bus 150 by executing read and write commands. However, the present invention is not limited thereto, and in another exemplary embodiment of the present invention, the memory management unit 110b may also move the data in the second flash memory module 130b by executing a copyback command. To be specific, the memory management unit 110b moves data between two physical blocks in the same flash memory module (for example, the second flash memory module 130b). Accordingly, in the example with the copyback command, instead of being transferred to the buffer memory through the data input/output bus 150, the data is read from a physical block and then directly written into another physical block through a buffer of the flash memory module. Thus, the time required for moving the data is effectively shortened in the present example.

Figure 6:
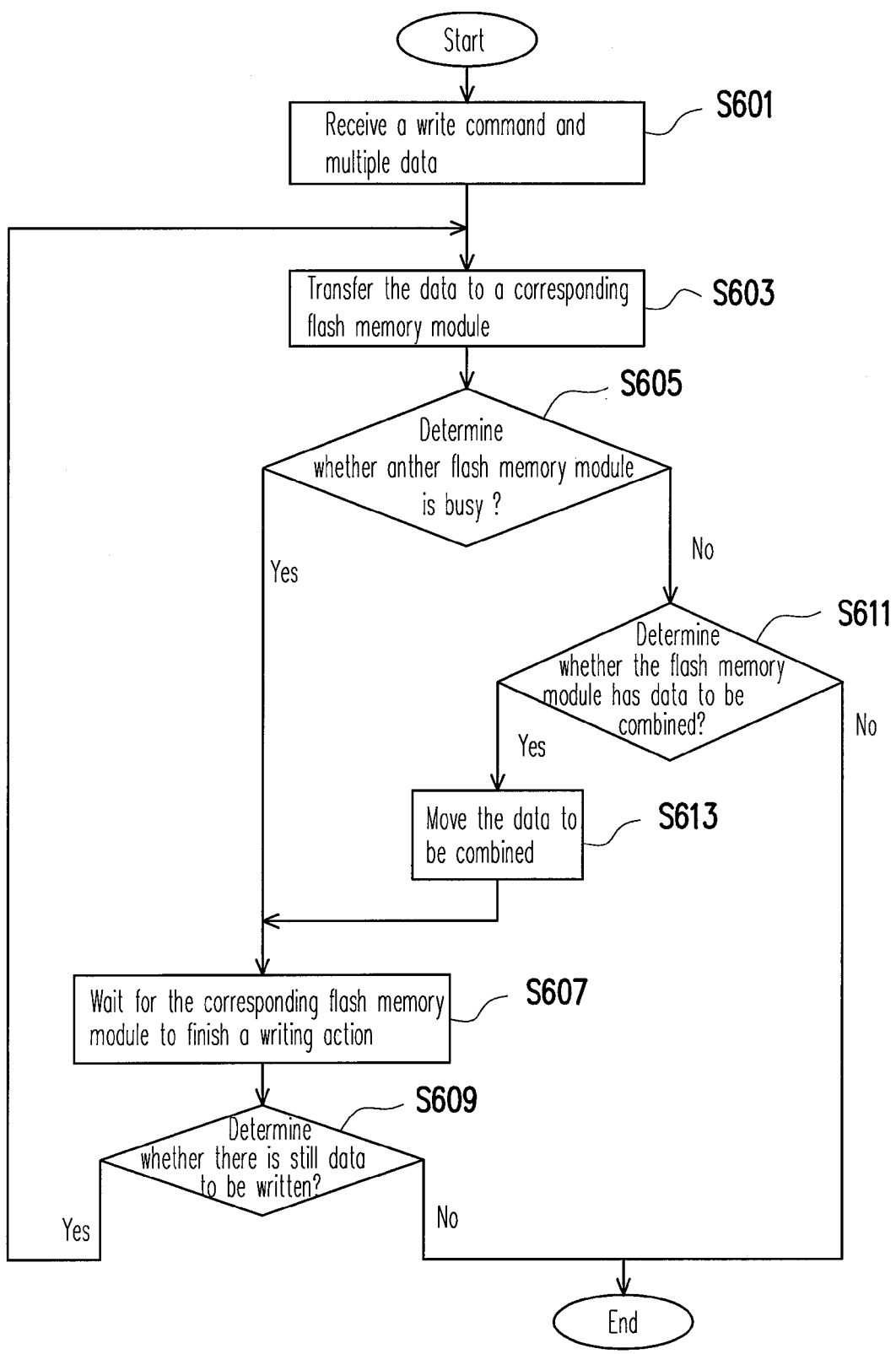
FIG. 6 is a flowchart of a data writing method according to an exemplary embodiment of the present invention.

FIG. 6 is a flowchart of a data writing method according to an exemplary embodiment of the present invention.

Referring to FIG. 6, first, in step S601, the flash memory controller 110 receives a write command and multiple data from the host system 200. Then, in step S603, the flash memory controller 110 transfers the data into the corresponding flash memory module according to the logical address-physical address mapping table (as shown in FIG. 5A).

After transferring the data to the corresponding flash memory module (i.e., the corresponding flash memory module enters the busy status), in step S605, the flash memory controller 110 determines whether the other flash memory module (for example, the second flash memory module 130b) is in the busy status. If the other flash memory module is in the busy status, in step S607, the flash memory controller 110 waits for the corresponding flash memory module to complete its programming action, and in step S609, it determines whether there is still data to be written.

If there is still data to be written, step S603 is executed. Otherwise, the process illustrated in FIG. 6 is ended.

If it is determined in step S605 that the other flash memory module is not in the busy status, in step S611, the flash memory controller 110 determines whether the other flash memory module contains any data to be combined. If the other flash memory module does not contain any data to be combined, the process illustrated in FIG. 6 is ended.

If the other flash memory module does contain data to be combined, in step S613, the flash memory controller 110 moves (for example, reads or writes) the data to be combined. The method for moving the data to be combined has been described above with reference to FIGS. 5A and 5B therefore will not be described herein. And, Step S607 is executed after step S613.

As described above, in exemplary embodiments of the present invention, when a memory management unit executes a write command on one of a plurality of flash memory modules, the memory management unit processes the data to be combined in another flash memory module when foregoing flash memory module is busy, so that when subsequently the memory management unit executes a write command on the other flash memory module and needs to close mother-child blocks, the time required for executing the write command is shortened. Thereby, the timeout problem is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method, for moving data in a first flash memory module or a second flash memory module during a write command of a host system is executed, wherein the first flash memory module and the second flash memory module respectively have a plurality of physical blocks, the data writing method comprising:

transferring first data received from the host system to the first flash memory module and writing the first data into the physical blocks of the first flash memory module according to the write command by a flash memory controller, wherein the flash memory controller is coupled to the first flash memory module and the second flash memory module through the same data input/output bus;

determining whether the second flash memory module is busy;

when the second flash memory module is not busy, determining whether at least one second data of at least one physical block in the physical blocks of the second flash memory module is needed to be combined; and when the at least one second data of the at least one physical block in the physical blocks of the second flash memory module is needed to be combined, moving the at least one second data of the at least one physical block in the physical blocks of the second flash memory module by the flash memory controller during the first data is written into the physical blocks of the first flash memory module.

2. The data writing method according to claim 1, wherein the step of moving the at least one second data of the at least one physical block in the physical blocks of the second flash memory module by the flash memory controller during the first data is written into the physical blocks of the first flash memory module comprises:

reading the at least one second data from one of the physical blocks of the second flash memory module by the flash memory controller during a part of the first data is written into the physical blocks of the first flash memory module.

3. The data writing method according to claim 1, wherein the step of moving the at least one second data of the at least one physical block in the physical blocks of the second flash memory module by the flash memory controller during the first data is written into the physical blocks of the first flash memory module comprises:

executing a copyback command on the second flash memory module by the flash memory controller to move the at least one second data during a part of the first data is written into the physical blocks of the first flash memory module.

4. The data writing method according to claim 2, wherein the step of moving the at least one second data of the at least one physical block in the physical blocks of the second flash memory module by the flash memory controller during the first data is written into the physical blocks of the first flash memory module further comprises:

writing the at least one second data into another one of the physical blocks of the second flash memory module by using the flash memory controller during another part of the first data is written into the physical blocks of the first flash memory module.

5. The data writing method according to claim 1, wherein the physical blocks of the first flash memory module have a plurality of upper pages and a plurality of lower pages, and the step of writing the first data into the physical blocks of the first flash memory module comprises:

only writing the first data into the lower pages of the physical blocks of the first flash memory module.

6. A flash memory control circuit, for moving data in a first flash memory module or a second flash memory module during a write command of a host system is executed, wherein the first flash memory module and the second flash memory module respectively have a plurality of physical blocks, the flash memory control circuit comprising:

a microprocessor unit;
a flash memory interface unit, coupled to the microprocessor unit, and configured to couple to the first flash memory module and the second flash memory module through the same data input/output bus;
a host interface unit, coupled to the microprocessor unit and configured to couple to the host system; and
a memory management unit, coupled to the microprocessor unit, and configured to transfer first data received from the host system to the first flash memory module and writing the first data into the physical blocks of the first flash memory module according to the write command,
wherein the memory management unit determines whether the second flash memory module is busy,
wherein when the second flash memory module is not busy, the memory management unit determines whether at least one second data of at least one physical block in the physical blocks of the second flash memory module is needed to be combined,
wherein when the at least one second data of the at least one physical block in the physical blocks of the second flash memory module is needed to be combined, the memory management unit moves the at least one second data of the at least one physical block in the physical blocks of the second flash memory module during the first data is written into the physical blocks of the first flash memory module.

7. The flash memory control circuit according to claim 6, wherein during a part of the first data is written into the physical blocks of the first flash memory module, the memory management unit reads the at least one second data from one of the physical blocks of the second flash memory module.

8. The flash memory control circuit according to claim 6, wherein during a part of the first data is written into the physical blocks of the first flash memory module, the memory management unit executes a copyback command on the second flash memory module to move the at least one second data.

9. The flash memory control circuit according to claim 7, wherein during another part of the first data is written into the physical blocks of the first flash memory module, the memory management unit writes the at least one second data into another one of the physical blocks of the second flash memory module.

10. The flash memory control circuit according to claim 6, wherein the physical blocks of the first flash memory module have a plurality of upper pages and a plurality of lower pages, and the memory management unit only writes the first data into the lower pages of the physical blocks of the first flash memory module.

11. A flash memory storage system, comprising:

a connector, configured to couple to a host system;
a flash memory chip, having a first flash memory module and a second flash memory module, wherein the first flash memory module and the second flash memory module respectively have a plurality of physical blocks; and
a flash memory controller, coupled to the connector, and coupled to the first flash memory module and the second flash memory module through the same data input/output bus,
wherein the flash memory controller receives a write command and first data from the host system,
wherein the flash memory controller transfers the first data to the first flash memory module and writes the first data into the physical blocks of the first flash memory module according to the write command,
wherein the flash memory controller determines whether the second flash memory module is busy,
wherein when the second flash memory module is not busy, the flash memory controller determines whether at least one second data of at least one physical block in the physical blocks of the second flash memory module is needed to be combined,
wherein when the at least one second data of the at least one physical block in the physical blocks of the second flash memory module is needed to be combined, the flash memory controller moves the at least one second data of the at least one physical block in the physical blocks of the second flash memory module during the first data is written into the physical blocks of the first flash memory module.

12. The flash memory storage system according to claim 11, wherein during a part of the first data is written into the physical blocks of the first flash memory module, the flash memory controller reads the at least one second data from one of the physical blocks of the second flash memory module.

13. The flash memory storage system according to claim 11, wherein during a part of the first data is written into the physical blocks of the first flash memory module, the flash memory controller executes a copyback command on the second flash memory module to move the at least one second data.

14. The flash memory storage system according to claim 12, wherein during another part of the first data is written into the physical blocks of the first flash memory module, the flash memory controller writes the at least one second data into another one of the physical blocks of the second flash memory module.

15. The flash memory storage system according to claim 11, wherein the physical blocks of the first flash memory module have a plurality of upper pages and a plurality of lower pages, and the flash memory controller only writes the first data into the lower pages of the physical blocks of the first flash memory module.

16. A data writing method, for moving data in one of a plurality of flash memory modules during a write command of a host system is executed, wherein the flash memory modules have a plurality of physical blocks, the data writing method comprising:

transferring first data received from the host system to one of the flash memory modules and writing the first data into the physical blocks of the flash memory module according to the write command by a flash memory controller;

determining whether another one of the second flash memory modules is busy;

when the another one of the second flash memory modules is not busy, determining whether at least one second data of at least one physical block in the physical blocks of the another one of the second flash memory modules is needed to be combined; and when the at least one second data of the at least one physical block in the physical blocks of the another one of the second flash memory modules is needed to be combined, moving the at least one second data of the at least one physical block in the physical blocks of the another one of the flash memory modules by the flash memory controller during the first data is written into the physical blocks of one of the flash memory modules.

17. The data writing method according to claim 16, wherein the step of providing the flash memory controller comprises:

coupling the flash memory controller to the flash memory modules through the same data input/output bus.

18. The data writing method according to claim 16, wherein the step of moving the at least one second data of the at least one physical block in the physical blocks of another one of the flash memory modules by the flash memory controller during the first data is written into the physical blocks of one of the flash memory modules comprises:

during a part of the first data is written into the physical blocks of one of the flash memory modules, reading the at least one second data from one of the physical blocks of another one of the flash memory modules by the flash memory controller.

19. The data writing method according to claim 18, wherein the step of moving the at least one second data of the at least one physical block in the physical blocks of another one of the flash memory modules by the flash memory controller during the first data is written into the physical blocks of one of the flash memory modules further comprises:

during another part of the first data is written into the physical blocks of one of the flash memory modules, writing the at least one second data into another one of the physical blocks of another one of the flash memory modules by the flash memory controller.

20. The data writing method according to claim 16, wherein the physical blocks of one of the flash memory modules have a plurality of upper pages and a plurality of lower pages, and the step of writing the first data into the physical blocks of the flash memory module comprises:

writing the first data only into the lower pages of the physical blocks of the flash memory module.

21. The data writing method according to claim 16, wherein the step of moving the at least one second data of the at least one physical block in the physical blocks of another one of the flash memory modules by the flash memory controller during the first data is written into the physical blocks of one of the flash memory modules comprises:

during a part of the first data is written into the physical blocks of one of the flash memory modules, executing a copyback command on another one of the flash memory modules by the flash memory controller to move the at least one second data.

* * * * *